(12) United States Patent
Miyata

(10) Patent No.: US 9,223,533 B2
(45) Date of Patent: Dec. 29, 2015

(54) TECHNIQUE FOR INFORMATION PROCESSING DEVICE AND PRINTER

(71) Applicant: BROTHER KOGYO KABUSHIKI KAISHA, Nagoya, Aichi (JP)

(72) Inventor: Yuji Miyata, Kitanagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 14/602,583

(22) Filed: Jan. 22, 2015

(65) Prior Publication Data
US 2015/0205559 A1 Jul. 23, 2015

(30) Foreign Application Priority Data

Jan. 22, 2014 (JP) .................... 2014-009599

(51) Int. Cl.
*G06F 3/12* (2006.01)
*G06K 15/00* (2006.01)

(52) U.S. Cl.
CPC .............. *G06F 3/1294* (2013.01); *G06F 3/121* (2013.01); *G06F 3/1222* (2013.01); *G06F 3/1234* (2013.01); *G06F 3/1238* (2013.01); *G06F 3/1288* (2013.01); *G06F 3/1292* (2013.01); *G06K 15/007* (2013.01)

(58) Field of Classification Search
None
See application file for complete search history.

(56) References Cited

U.S. PATENT DOCUMENTS

| | | | | |
|---|---|---|---|---|
| 6,115,132 A | * | 9/2000 | Nakatsuma et al. | 358/1.14 |
| 6,314,476 B1 | * | 11/2001 | Ohara | 710/15 |
| 2008/0246987 A1 | * | 10/2008 | Scrafford et al. | 358/1.15 |
| 2009/0296144 A1 | * | 12/2009 | Fukasawa | 358/1.15 |
| 2010/0250787 A1 | * | 9/2010 | Miyata | 710/9 |
| 2015/0178031 A1 | * | 6/2015 | Kanamori | 358/1.15 |

OTHER PUBLICATIONS

"What is Google Cloud Print", (URL: https://developers.google.com/cloud-print) and URL: https://developers.google.com/cloud-print/docs/overview), searched on the Internet on Jun. 25, 2013.

* cited by examiner

*Primary Examiner* — Miya J Cato
(74) *Attorney, Agent, or Firm* — Scully, Scott, Murphy & Presser, P.C.

(57) ABSTRACT

An information processing device may receive, from a server, identification information for identifying an image file being stored in the server and status information indicating a print process status of the image file, display a first screen indicating these information, and send a change instruction to the server. The change instruction may be for changing status information of a designated image file into a first status indicating where a print process for an image file has not been performed. The information processing device may send print instruction information and authentication information to a printer. The print instruction information may be for causing the printer to acquire print data from the server. The authentication information may be used by the printer to acquire the print data from the server.

12 Claims, 8 Drawing Sheets

TECHNIQUE FOR INFORMATION PROCESSING DEVICE AND PRINTER

CROSS-REFERENCE TO RELATED APPLICATIONS

This application claims priority to Japanese Patent Application No. 2014-009599, filed on Jan. 22, 2014, the contents of which are hereby incorporated by reference into the present application.

TECHNICAL FIELD

The present specification discloses a technique for an information processing device to cause a printer to perform printing by using a server.

DESCRIPTION OF RELATED ART

A service on the Internet called Google (registered trademark) Cloud Print (hereinafter referred to as "GCP") is known. For example, a user accesses a printer by using a terminal device and causes the printer to perform communication with a server that provides the GCP (hereinafter referred to as "GCP server"). Thus, the printer registers printer-related information in the GCP server. As a result, an XMPP (abbreviation of eXtensible Messaging and Presence Protocol) connection is established between the printer and the GCP server. After that, the user submits an image file representing an image to be printed to the GCP server by using, for example, the terminal apparatus. In this case, the GCP server supplies a submit notification to the printer using the XMPP connection. Upon acquiring the submit notification from the GCP server, the printer acquires print data generated from the image file and performs printing of the image represented by the print data.

SUMMARY

According to the above technique, when printing is performed, if a print error occurs due to, for example, a consumable item (ink, toner or the like) becoming empty or a paper jam, a status of a print job is changed to an error status. In normal, printing is not performed for a print job having an error status. For this reason, the user needs to submit the image file to the GCP server again in order to cause the printer to print the image file in which an error has occurred. However, there may be circumstances in which the user cannot submit the image file to the GCP server again. Examples of such circumstances may include a circumstance in which it is difficult for the user to identify the image file in which the error has occurred, a circumstance in which the image file in which the error has occurred has been lost.

The present specification discloses a non-transitory computer-readable recording medium storing computer-readable instructions for an information processing device. The computer-readable instructions, when executed by a processor of the information processing device, may cause the information processing device to perform: accepting a selection of an image file; in response to accepting the selection of the image file, sending the selected image file to a server via a communication interface of the information processing device, so as to store the selected image file in the server; receiving identification information and status information from the server via the communication interface, the identification information being for identifying an image file being stored in the server, the status information indicating a print process status of the image file being stored in the server, the status information indicating any one of a plurality of statuses including a first status and a second status, the first status indicating a status where a print process for an image file has not been performed, the second status indicating a status where a print process for an image file has been performed; causing a display unit of the information processing device to display a first screen indicating the received identification information and the received status information; accepting, while the first screen is displayed, an input for changing status information of a designated image file which is identified by designated identification information designated from among the received identification information; sending a change instruction to the server via the communication interface, in response to accepting the input for changing the status information of the designated image file from the second status into the first status; accepting an input for performing a process of sending print instruction information and authentication information to a printer, the authentication information being for accessing the image file being stored in the server, the print instruction information being for causing the printer to acquire print data from the server, the print data being generated based on an image file having the status information indicating the first status, the authentication information being used by the printer to acquire the print data from the server; and sending the print instruction information and the authentication information to the printer via the communication interface, in response to accepting the input for performing the process of sending the print instruction information and the authentication information to the printer.

The present specification also discloses a printer comprising: a communication interface; a print performing unit; a processor; and a memory storing computer-readable instructions therein. The computer-readable instructions, when executed by the processor, may cause the printer to perform: receiving print instruction information and authentication information from an information processing device via the communication interface, the authentication information being for accessing an image file being stored in a server; receiving identification information and status information from the server via the communication interface by using the authentication information, in response to receiving the print instruction information and the authentication information from the information processing device, the identification information being for identifying the image file being stored in the server, the status information indicating a print process status of the image file being stored in the server, the status information indicating any one of a plurality of statuses including a first status and a second status, the first status indicating a status where a print process for an image file has not been performed, the second status indicating a status where a print process for an image file has been performed; specifying, from among the received identification information, identification information for identifying an image file having status information indicating the first status; sending a request to the server via the communication interface for sending print data being generated based on the specified image file identified by the specified identification information; receiving the print data from the server via the communication interface in response to sending the request to the server; causing the print performing unit to perform a print process by using the print data; and sending a change instruction to the server via the communication interface in a case where an error occurs in the print process, the change instruction being for changing the status information of the specified image file from the first status into the second status.

The technique disclosed in the present specification can be realized by various aspects including, for example, an information processing device, a controlling device for controlling an information processing device, an information processing system, an information processing method, a non-transitory computer-readable recording medium storing an information processing program.

EMBODIMENT

Figure 1:
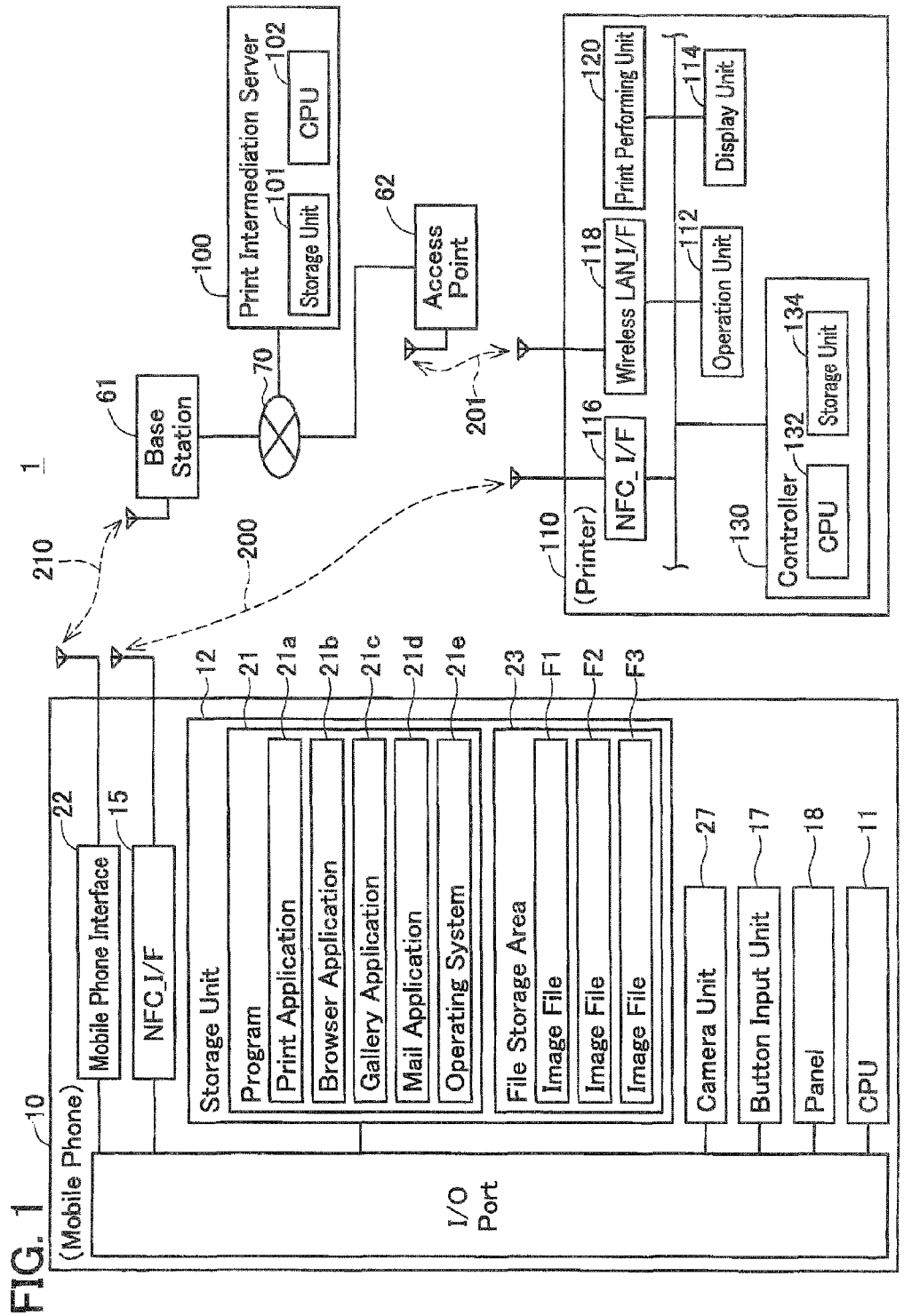
FIG. 1 illustrates a configuration of a communication system.

FIG. 1 shows a block diagram of a communication system 1. The communication system 1 comprises a mobile phone 10, a printer 110, an access point 62, a print intermediation server 100, and a base station 61. The access point 62 is a known relay device. It is possible for the print intermediation server 100 to communicate with the mobile phone 10 via the Internet 70 and the base station 61. It is also possible for the print intermediation server 100 to communicate with the printer 110 via the Internet 70 and the access point 62.

The Android (registered trademark of Google Inc.) platform is installed in the mobile phone 10. The mobile phone 10 mainly comprises a CPU 11, a storage unit 12, an NFC (also referred to as "Near Field Communication") interface 15, a button input unit 17, a panel 18, a mobile phone interface 22 and a camera unit 27. The CPU 11 performs control of various functions in accordance with programs stored in the storage unit 12, various kinds of signals that are sent and received via the NFC_I/F 15, or the like. The CPU 11 also functions as various means by reading a program. In the present specification the term "interface" is abbreviated as "IF".

The storage unit 12 is provided with a program 21. The storage unit 12 may also be configured by combining a RAM (also referred to as Random Access Memory), a ROM (also referred to as Read Only Memory), a flash memory, an HDD (also referred to as hard disk), and the like. The storage unit 12 may be a computer-readable storage medium. The computer-readable storage medium is a non-transitory medium, such as a ROM, RAM, flash memory, hard disk, etc. An electrical signal carrying a program to be downloaded from a server, etc. on the Internet is not included in the non-transitory medium.

The program 21 is provided with a print application 21a, a browser application 21b, a gallery application 21c, a mail application 21d and an operating system 21e (hereinafter referred to as "OS 21e"). The print application 21a and the mail application 21d are applications for Android (registered trademark of Google Inc.).

The print application 21a is an application for executing printing at the printer 110 utilizing the print intermediation server 100. The print application 21a is an application that is provided by the vendor of the printer 110. The print application 21a may be installed in the mobile phone 10 from an unshown server on the Internet, or may be installed in the mobile phone 10 from a medium that is shipped together with the printer 110.

The browser application 21b is an application for displaying Web data acquired from the print intermediation server 100 on the panel 18. The gallery application 21c is an application for displaying an image that is based on image data on the panel 18, and performing various kinds of conversion processing (color correction or the like) on the image data. The mail application 21d is an application for sending electronic mail via the wireless communication 210.

The OS 21e is a program that provides basic functions that are shared and utilized by the print application 21a and the mail application 21d. The OS 21e manages data transfer between the print application 21a and the mail application 21d. That is, the OS 21e is equipped with a share function that controls data transfer between a share source application and a share destination application.

The storage unit 12 is further provided with a file storage area 23. The file storage area 23 is an area for storing various kinds of data files. The file storage area 23 stores three image files F1 to F3. The image files F1 to F3 are, for example, files representing images captured by the mobile phone 10. The image files F1 to F3 may be files in any file format, may be, for example, files in bitmap format such as JPEG, files in vector format or files in text format.

The NFC_I/F 15 is an I/F (that is, an IC chip or a communication circuit) for executing wireless communication 200 (hereunder, referred to as "NFC communication 200") in accordance with the NFC scheme for so-called "short-range wireless communication". The NFC scheme is a wireless communication scheme based on, for example, International Standard ISO/IEC 21481 or 18092. The mobile phone I/F 22 performs wireless communication 210 with the base station 61. The wireless communication 210 may be cellular wireless communication such as 3G or 4G cellular communication. The button input unit 17 includes keys for executing various functions of the mobile phone 10. The button input unit 17 may be integrally formed as a touch panel with the panel 18. The panel 18 displays information of various functions of the mobile phone 10.

The printer 110 is a peripheral device that is capable of performing a print function (that is, a peripheral device of a PC or the like). The printer 110 comprises an operation unit 112, a display unit 114, an NFC interface 116, a wireless LAN (also referred to as "Local Area Network") interface 118, a print performing unit 120 and a controller 130. The respective units 112 to 130 are connected to a bus line (reference symbol is omitted).

The operation unit 112 includes a plurality of keys. A user can issue various instructions to the printer 110 by operating the operation unit 112. The display unit 114 is a display for displaying various kinds of information. The print performing unit 120 is a printing mechanism such as an inkjet or laser printing mechanism. The configuration of the NFC_I/F 116 is the same as the configuration of the NFC_I/F 15 that is described above, and hence a description thereof is omitted here.

The wireless LAN_I/F 118 is an I/F (that is, an IC chip or communication circuit) for executing wireless communication (hereunder, referred to as "Wi-Fi communication") in accordance with a Wi-Fi system that is defined by the Wi-Fi Alliance. The Wi-Fi system is, for example, a wireless communication system based on the IEEE (referred to as The Institute of Electrical and Electronics Engineers, Inc.) 802.11 standards and standards (for example, 802.11a, 11b, 11g, 11n, etc.) conforming to the IEEE 802.11 standards. The wireless LAN_I/F 118 may be an I/F for executing wireless communication through an access point (that is, infrastructure-based wireless communication), or may be an I/F for executing wireless communication without passing through an access point (for example, ad-hoc wireless communication or wireless communication according to the Wi-Fi Direct system).

The controller 130 comprises a CPU 132 and a storage unit 134. The CPU 132 is a processor that executes various kinds of processing in accordance with an unshown program stored in the storage unit 134. The storage unit 134 is constituted by a RAM or a ROM or the like. Similarly to the storage unit 12, the storage unit 134 may be a computer-readable storage medium.

The print intermediation server 100 is a server installed on the Internet and provided by a vendor of the printer 110. However, in a modification, the print intermediation server 100 may also be a server provided by a provider different from the vendor of the printer 110, for example.

The print intermediation server 100 is a server for executing printing intermediation between an external device (for example, the mobile phone 10) and a printer (for example, the printer 110). That is, the print intermediation server 100 converts an image file that is submitted from an external device to generate print data in a data format that can be interpreted by a printer, and supplies the print data to the relevant printer. Accordingly, even if the external device is not equipped with a printer driver for converting the image file to print data, the external device can cause the printer to execute printing of the image file by submitting the image file to the print intermediation server 100.

The print intermediation server 100 comprises a storage unit 101 and a CPU 102. The CPU 102 is a processor that executes various types of process according to a program (not shown) stored in the storage unit 101. The storage unit 101 is an area for storing various types of information (e.g., submit contents X1 which will be described later) submitted (that is, registered) from an external device such as the mobile phone 10.

Hereunder, in some cases the CPU 11 that executes a program such as an application or the OS 21e is simply described by only the program name. For example, the description "print application 21a" can mean "the CPU 11 that executes the print application 21a". In the present specification, the description "the CPU 11 of the mobile phone 10 receives various kinds of information" includes the technical meaning that "the CPU 11 of the mobile phone 10 acquires various kinds of information via the mobile phone I/F 22 and the NFC_I/F 15". Further, the description "the CPU 11 of the mobile phone 10 sends various kinds of information" includes the technical meaning that "the CPU 11 of the mobile phone 10 outputs various kinds of information via the mobile phone I/F 22 and the NFC_I/F 15".

The user of the mobile phone 10 performs the following advance preparation in order to cause the printer 110 to perform printing by utilizing the print intermediation server 100.

The user of the mobile phone 10 registers the account information AC1 in the print intermediation server 100 using, for example, the mobile phone 10. The account information AC1 includes, for example, user ID and password. Instead of using the mobile phone 10, the user may also use other devices (for example, PC (not shown)) to register the account information AC1 in the print intermediation server 100. Once the account information of the user is registered in the print intermediation server 100, the user can cause the printer 110 to execute printing using the print intermediation server 100.

Furthermore, the user of the mobile phone 10 executes a registration process for registering various kinds of information relating to the mobile phone 10 in the print intermediation server 100. In the registration process in the present embodiment, a so-called OAuth technique is used. Detailed description of specific process contents of the registration process is omitted here. Once the registration process is executed, the print intermediation server 100 generates a unique authentication token corresponding to account information AC1. The print intermediation server 100 stores the account information AC1, printer ID and authentication token in association with each other in the storage unit 101. The authentication token generated by the print intermediation server 100 is also stored in the storage unit 12 of the mobile phone 10.

Figure 2:
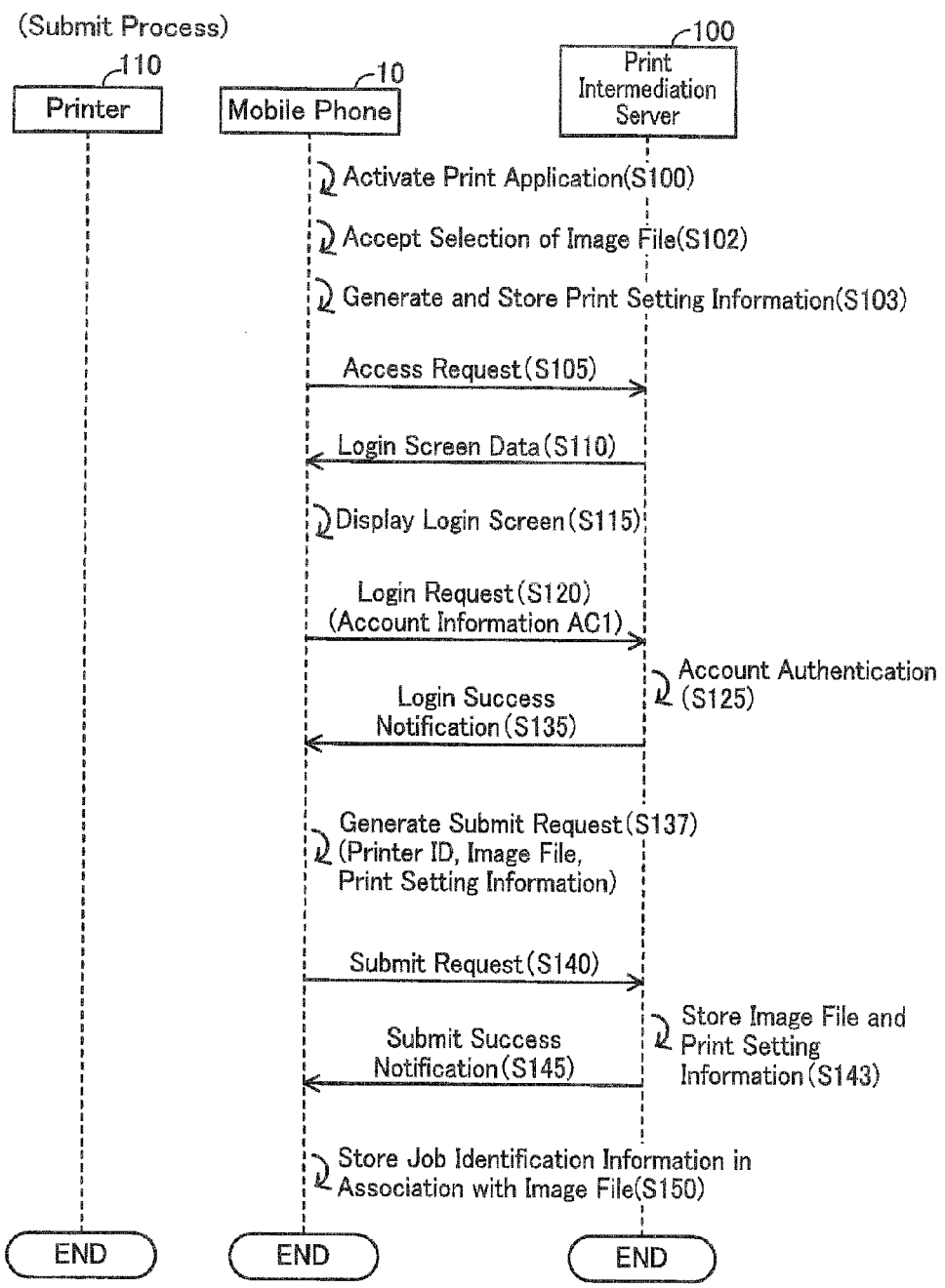
FIG. 2 illustrates a sequence diagram of a submit process.

The submit process will be described with reference to FIG. 2. The submit process is a process for submitting (that is, registering) an image file representing an image to be printed to the print intermediation server 100 using the print application 21a.

In the submit process, the user of the mobile phone 10 need not be present in the vicinity of the printer 110. For example, when the user is visiting a location away from the home or office, the user can submit an image file that represents an image that was photographed using the mobile phone 10 to the print intermediation server 100.

In S100, when the user inputs an operation of activating the print application 21a via the button input unit 17, the CPU 11 activates the print application 21a based on the OS 21e. In S102, the CPU 11 accepts an input of an operation for selecting an image file to be submitted. For example, a list of the image files F1 to F3 stored in the storage unit 12 of the mobile phone 10 may be displayed and a selection of one image file may be accepted. In the present embodiment, the following description will be continued assuming a case where the image file F1 is selected as a file to be submitted to the print intermediation server 100 as an example.

In S103, the CPU 11 generates print setting information P1 relating to the image file F1 and stores the print setting information P1 in the storage unit 12. The print setting information P1 is information indicating a print setting when causing the printer to print the image file F1. Examples of the print setting information P1 include paper size, color mode (color printing or monochrome printing) etc. The print setting information P1 may be generated in response to accepting inputs of various types of print settings via a print setting screen.

In response to completing generating of the print setting information P1, in S105, the CPU 11 supplies an access request to the print intermediation server 100 via the mobile phone I/F 22. In response to receiving the access request from the mobile phone 10, in S110, the print intermediation server 100 sends login screen data to the mobile phone 10.

Upon acquiring the login screen data from the print intermediation server 100 via the mobile phone I/F 22, in S115, the CPU 11 causes the login screen represented by the login screen data to be displayed on the panel 18. The user inputs the account information AC1 to the mobile phone 10 using the button input unit 17. In S120, the CPU 11 supplies a login request including the account information AC1 to the print intermediation server 100 via the mobile phone I/F 22.

Upon acquiring the login request from the mobile phone 10, in S125, the print intermediation server 100 executes authentication of the account information AC1 included in the login request. More specifically, the print intermediation server 100 determines whether or not the account information AC1 included in the login request has already been registered in the print intermediation server 100. Upon succeeding in the authentication of the account information AC1, in S135, the print intermediation server 100 supplies a login success notification to the mobile phone 10.

In response to acquiring a login success notification from the print intermediation server 100 via the mobile phone I/F 22, in S137, the CPU 11 generates a submit request. The submit request includes the printer ID in the storage unit 12, the image file F1, and the print setting information P1 generated in S103. In S140, the CPU 11 supplies the submit request to the print intermediation server 100 via the mobile phone I/F 22. Note that the image file F1 included in the submit request is a copy file obtained by copying the image file F1 stored in the file storage area 23. Therefore, when the image file F1 is submitted to the print intermediation server 100, the same image file F1 is stored in the print intermediation server 100 and the mobile phone 10. In this case, the image file F1 stored in the mobile phone 10 is the copy source of the image file F1 stored in the print intermediation server 100.

In S143, the print intermediation server 100 stores the image file F1 and print setting information P1 in association with the printer ID included in the submit request. The print intermediation server 100 generates unique job identification information I1 for identifying the image file F1 and print status information T1 of "QUEUED" status and stores these pieces of information I1 and T1 in association with the image file F1. As a result, the print intermediation server 100 further associates the image file F1, print setting information P1, job identification information I1 and print status information T1 of "QUEUED status" in addition to the account information AC1, printer ID and authentication token.

The type of the print status information T1 will be described. The print status information T1 is information indicating a print status of the image file F1. The print status information T1 indicates any one of "QUEUED status," "DONE status" and "ERROR status." The "QUEUED status" indicates a status in which a print process using the image file F1 is being waited. The "DONE status" indicates a print completion status in which a print process using the image file F1 has been completed without any error. The "ERROR status" indicates a status in which an error has occurred in the print process using the image file F1. When the print status information T1 is "QUEUED status," printing based on the image file F1 can be executed by the printer, but when the print status information T1 is "DONE status" or "ERROR status," printing based on the image file F1 cannot be executed by the printer.

The print status information T1 may include error identification information. The error identification information is information for identifying the type of an error. The error identification information indicates "print setting ERROR" or "machine ERROR." "Print setting ERROR" indicates an error caused by incompatibility of the print setting information P1 with the printer. An example of "print setting ERROR" is a case where the printer does not support a printing paper size being set in the print setting information. "Machine ERROR" indicates an error caused by machine trouble. An example of "machine ERROR" is a case where the amount of a consumable item (ink, toner or the like) of the printer falls to or below a predetermined value or a case where jamming has occurred in the printing medium. When a "print setting ERROR" has occurred, the print status information can be changed to a "QUEUED status." In this way, under a status in which a "print setting ERROR" has occurred, a mandatory print process which will be described later can be executed. When a "machine ERROR" has occurred, the print status information cannot be changed to a "QUEUED status." In this way, under a status in which a "machine ERROR" has occurred, the mandatory print process which will be described later cannot be executed.

In S145, the print intermediation server 100 supplies a submit success notification to the mobile phone 10. The submit success notification includes the job identification information I1. The CPU 11 acquires the submit success notification from the print intermediation server 100 via the mobile phone I/F 22.

In S150, the CPU 11 stores in the storage unit 12 the job identification information I1 included in the submit success notification in association with the image file F1. The submit process then ends.

Figure 3:
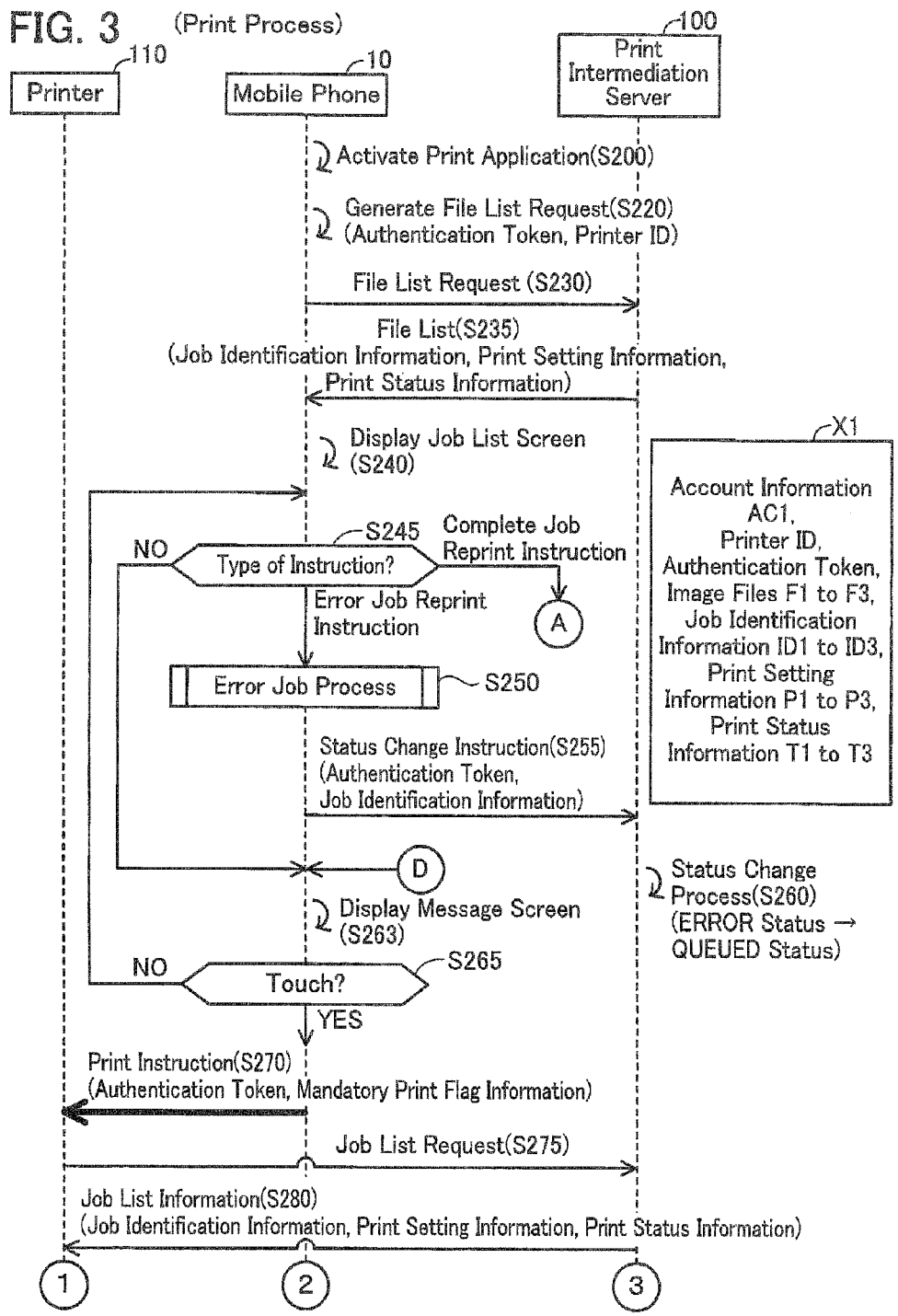
FIG. 3 illustrates a sequence diagram of a print process.

Next, a print process for the mobile phone 10 to cause the printer 110 to execute printing will be described with reference to FIG. 3 to FIG. 7. In FIG. 3, a thick-line arrow indicates NFC communication 200. In the print process, the user of the mobile phone 10 needs to be located near the printer 110. This is because the mobile phone 10 and printer 110 need to perform NFC communication 200 as will be described later. Thus, after coming home from outside, for example, the user causes the printer 110 to execute printing using the mobile phone 10.

In the present embodiment, operation when submit contents X1 in FIG. 3 is stored in the print intermediation server 100 will be described below. The submit contents X1 include a plurality of pieces of information which are associated with each other. The plurality of pieces of information include the account information AC1, printer ID and authentication token. The plurality of pieces of information also include various kinds of information relating to the three image files F1 to F3. The information relating to the image file F1 includes the image file F1, job identification information I1, print setting information P1 and print status information T1. The information relating to the image file F2 includes the image file F2, job identification information I2, print setting information P2 and print status information T2. The information relating to the image file F3 includes the image file F3, job identification information I3, print setting information P3 and print status information T3. In the present embodiment, each of the print status information T1 to T3 indicates "QUEUED status," "ERROR status or "DONE status."

When the user of the mobile phone 10 wants the printer 110 to perform printing, the user activates the print application 21a so as to execute printing operation in S200. The printing operation includes a selection of a button showing "print" on the screen displayed according to the print application 21a.

Upon accepting an input of a print instruction, in S220, the CPU 11 generates a file list request including the authentication token and printer ID. In S230, the CPU 11 supplies the file list request to the print intermediation server 100 via the mobile phone I/F 22 (that is, by executing wireless communication 210).

Upon acquiring the file list request from the mobile phone 10, the print intermediation server 100 performs authentication of the authentication token and printer ID included in the file list request. Upon determining that the authentication token and printer ID are registered (that is, when the authentication is successful), in S235, the print intermediation server 100 supplies the file list to the mobile phone 10. The file list includes the job identification information I1 to I3, print setting information P1 to P3, and print status information T1 to T3.

Figure 8:
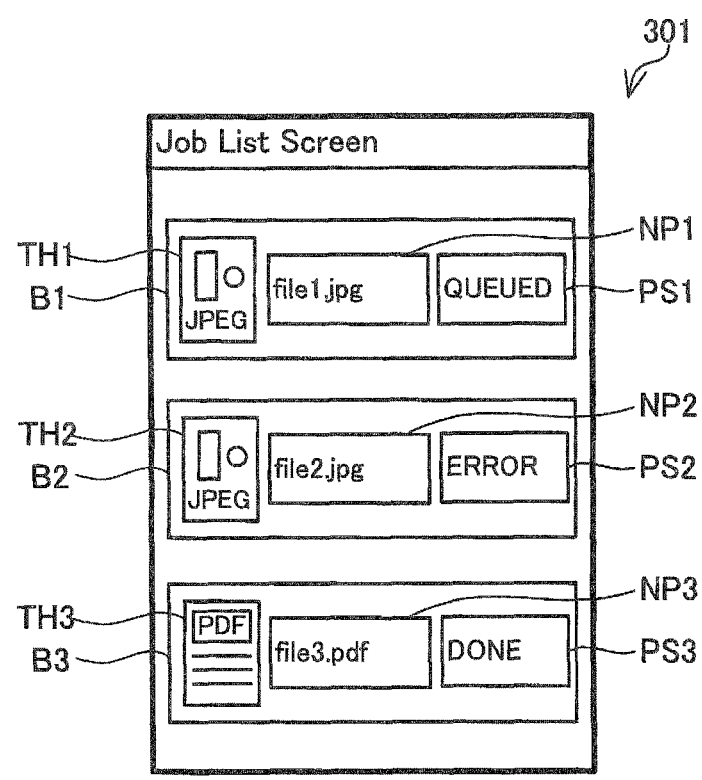
FIG. 8 illustrates an example of a job list screen.

Upon acquiring the file list from the print intermediation server 100 via the mobile phone I/F 22, in S240, the CPU 11 causes the panel 18 to display a job list screen using the file list in S240. FIG. 8 illustrates an example of the job list screen 301. The job list screen 301 includes button images B1 to B3. The button images B1 to B3 are images for inputting various types of instructions on the image files F1 to F3.

The button image B1 includes a thumbnail image TH1, a job name image NP1, and a print status image PS1. The thumbnail image TH1 is a reduced image of an image formed of the image file F1. The job name image NP1 indicates a content of the job identification information I1. The print status image PS1 indicates a content (that is, "QUEUED status") of the print status information T1. The types of the button images B2 and B3 are similar to that of the button image B1.

In S245, the CPU 11 determines the type of an instruction accepted via the job list screen 301. Examples of types of instructions determined in S245 include an error job reprint instruction and a complete job reprint instruction.

The error job reprint instruction is an instruction for returning the print status information of an image file having print status information of "ERROR status" to "QUEUED status" and causing the image file to be reprinted. An input of the error job reprint instruction may be accepted by detecting a tap input to the print status image PS2 indicating "ERROR status" on the job list screen 301 in FIG. 8, for example.

The complete job reprint instruction is an instruction for returning the print status information of an image file having print status information of "DONE status" to "QUEUED status" and causing the image file to be reprinted. An input of the complete job reprint instruction may be accepted by detecting a tap input to the print status image PS3 indicating "DONE status" on the job list screen 301 in FIG. 8, for example.

When the input of the error job reprint instruction or complete job reprint instruction has not been accepted in S245 (NO in S245), the flow proceeds to S263. On the other hand, when the input of the error job reprint instruction has been accepted in S245 (error job reprint instruction in S245), the flow proceeds to S250. In the present embodiment, description will be continued below by taking a case where the print status image PS2 in FIG. 8 is tapped by the user and the input of the error job reprint instruction on the image file F2 has been accepted as an example.

In S250, the CPU 11 performs an error job process. The contents of the error job process will be described using FIG. 7. In S510, the CPU 11 determines whether or not the print status information T2 of the image file F2 includes error identification information. The flow proceeds to S255 in the case of a negative determination (S510: NO) and the flow proceeds to S515 in the case of a positive determination (S510: YES).

In S515, the CPU 11 determines the type of the error identified by the error identification information. When the type of the error is determined to be "print setting ERROR" (print setting ERROR in S515), the flow proceeds to S520.

In S520, the CPU 11 causes a mandatory print performance acceptance screen to be displayed on the panel 18. The mandatory print performance acceptance screen is a screen for accepting an input of an instruction relating to whether or not to perform a mandatory print process. The mandatory print process is a process for mandatorily performing printing when "print setting ERROR" has occurred. The mandatory print performance acceptance screen may include a button image for accepting performance of a mandatory print process In S525, the CPU 11 determines whether or not a performance instruction of the mandatory print process has been input. This determination, for example, may be made depending on whether or not a tap input for the button image for accepting performance of the mandatory print process is detected. The flow proceeds to S255 in the case of a negative determination (NO in S525) and proceeds to S530 in the case of a positive determination (YES in S525).

In S530, the CPU 11 sets mandatory print flag information G2 relating to the image file F2 from "mandatory unprintable" to "mandatory printable." The mandatory print flag information is information for instructing whether or not to perform the mandatory print process. The flow then proceeds to S255.

On the other hand, in S515, when it is determined that the type of the error is "machine ERROR" (machine ERROR in S515), the flow proceeds to S540. In S540, the CPU 11 causes a message screen to be displayed on the panel 18. The message screen includes a message for prompting the user to release the present error. The message screen may include an OK button image for accepting an instruction from the user when the error is released. In S550, the CPU 11 determines whether or not the user has released the error. The determination, for example, may be made by detecting whether or not a tap input to the OK button image has been detected. The flow returns to S550 in the case of a negative determination (NO in S550) and proceeds to S255 in the case of a positive determination (YES in S550).

In S255 of FIG. 3, the CPU 11 sends a status change instruction to the print intermediation server 100. The status change instruction is information for instructing the print intermediation server 100 to change the print status information T2 of the image file F2 from "ERROR status" to "QUEUED status." The status change instruction includes the authentication token and job identification information I2.

In S260, the print intermediation server 100 performs a status change process. This causes the content of the print status information T2 of the image file F2 to be changed from "ERROR status" to "QUEUED status."

In response to sending the status change instruction, in S263, the CPU 11 causes the panel 18 to display a message screen including a message for prompting the user to bring the mobile phone 10 close to the printer 110. In S265, the CPU 11 determines whether or not the mobile phone 10 has touched the printer 110. In the case of a negative determination (NO in S265), the flow returns to S245. On the other hand, in the case of a positive determination (YES in S265), NFC communication 200 is established between the NFC_I/F 15 of the mobile phone 10 and the NFC_I/F 116 of the printer 110, and the flow proceeds to S270.

In S270, the CPU 11 sends a print instruction to the printer 110 using the NFC communication 200. The print instruction is an instruction for causing the printer 110 to acquire print data from the print intermediation server 100. The print data is data generated based on an image file corresponding to "QUEUED status" and is data having a data format interpretable for the printer 110. The print instruction includes the authentication token and mandatory print flag information G2. Note that in the case of a positive determination in S525 (YES in S525), the print instruction may include mandatory print flag information G2.

In S275, the CPU 132 of the printer 110 sends a job list request to the print intermediation server 100 via the wireless LAN_I/F 118 using the URL of the print intermediation server 100 stored beforehand in the storage unit 134. In S280, the print intermediation server 100 supplies job list information to the printer 110. The job list information includes information relating to the image files F1 to F3 stored in the print intermediation server 100 (that is, job identification information I1 to I3, print setting information P1 to P3, and print status information T1 to T3).

Figure 4:
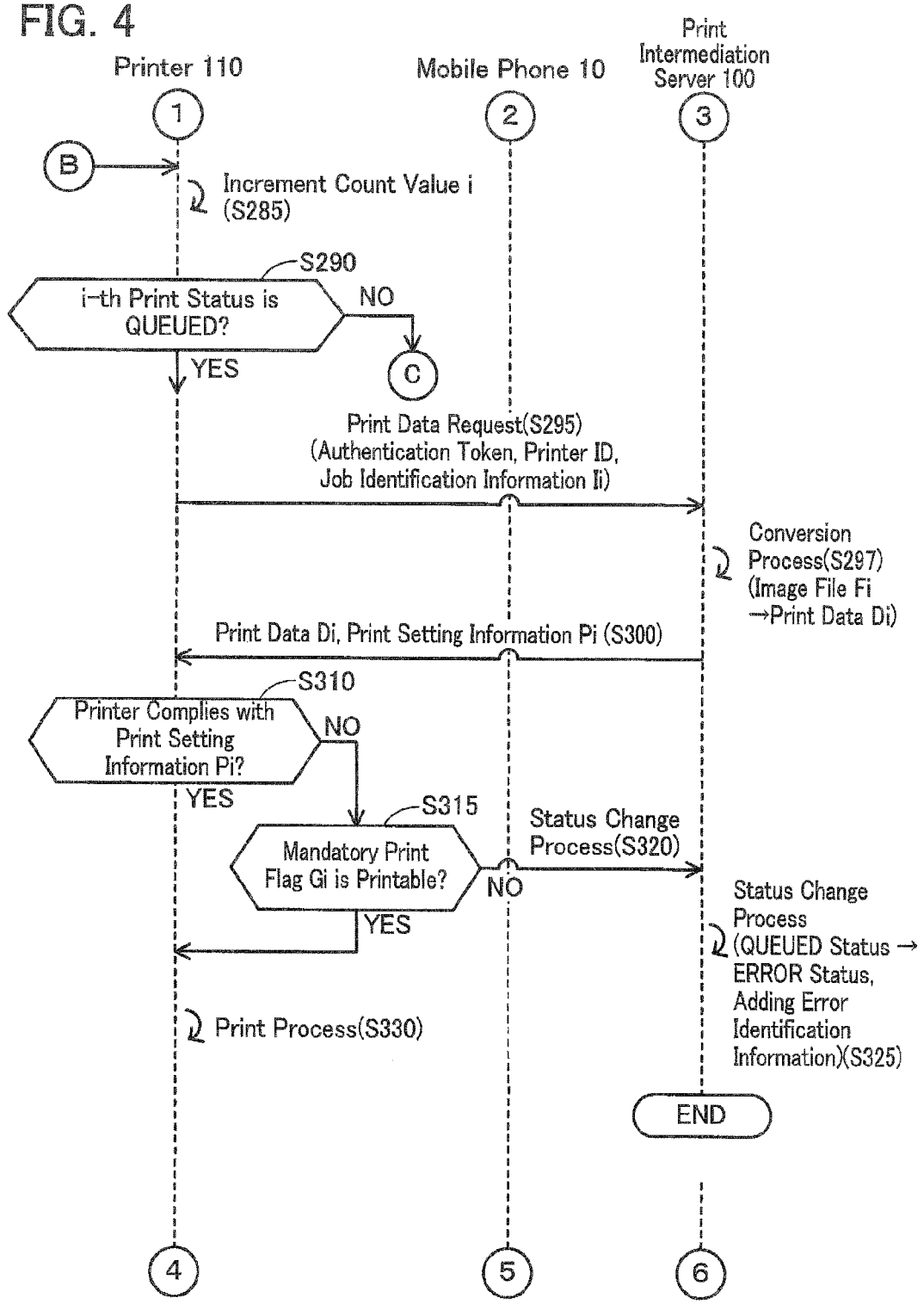
FIG. 4 illustrates a sequence diagram of a print process.
Figure 5:
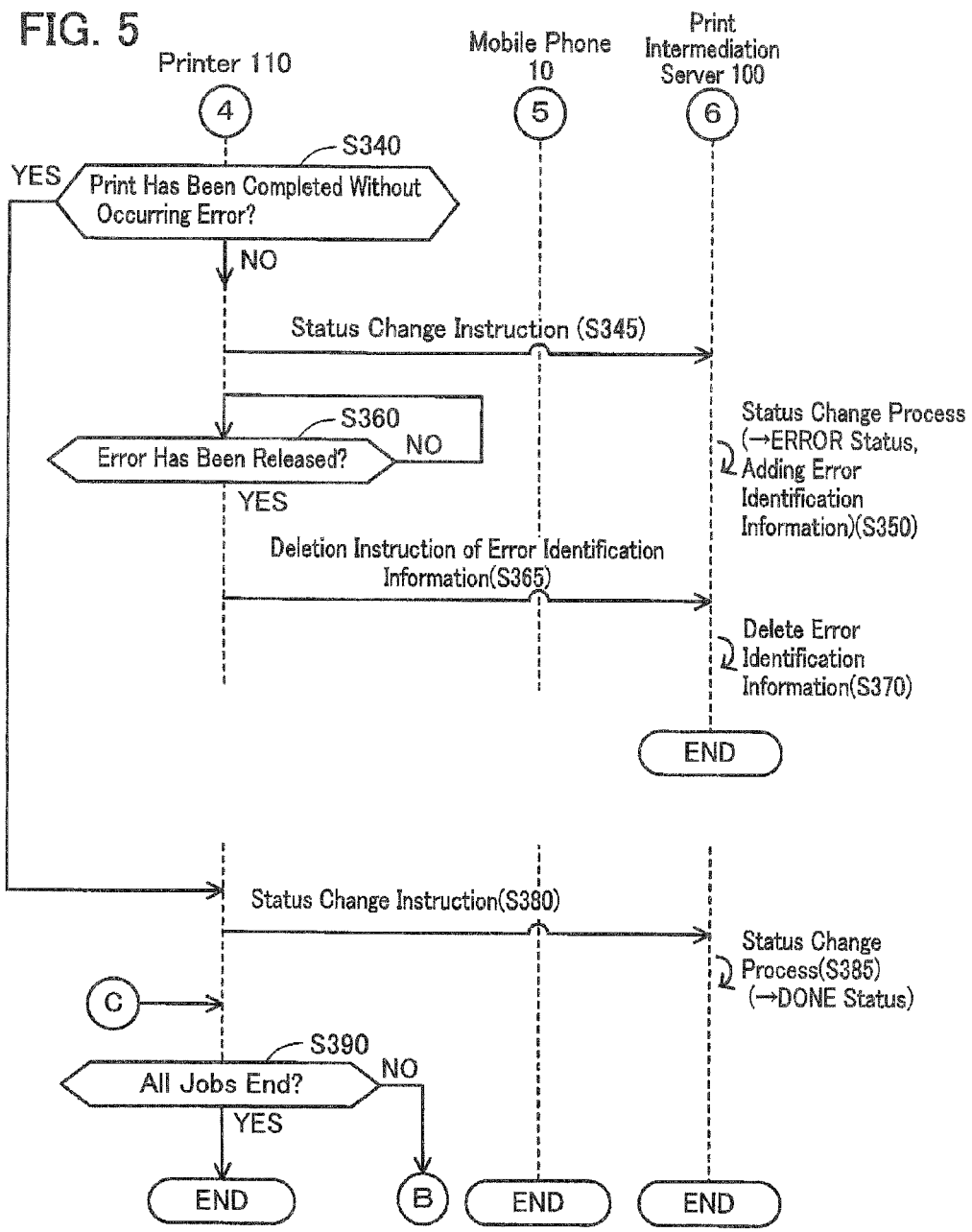
FIG. 5 illustrates a sequence diagram of a print process.

In S285 of FIG. 4, the CPU 132 increments a count value i by 1. The count value i is a pointer value used to determine the type of status regarding three pieces of print status information T1 to T3 included in the job list information. An initial value of the count value i may be "0." In the present embodiment, the count value i is sequentially incremented from 1 to 3. In the following description, the image files F1 to F3, job identification information I1 to I3, print setting information P1 to P3 and print status information T1 to T3 may be each expressed using the count value i. For example, "image file Fi" represents any of image files F1 to F3.

In S290, the CPU 132 determines whether or not the i-th print status information indicates "QUEUED status." The flow proceeds to S390 in the case of a negative determination (NO in S290) and proceeds to S295 in the case of a positive determination (YES in S290).

In S295, the CPU 132 sends a print data request to the print intermediation server 100 via the wireless LAN_I/F 118. The print data request includes the authentication token, printer ID, and job identification information Ii. The job identification information Ii is information for identifying an i-th image file Fi.

Upon acquiring the print data request from the printer 110, the print intermediation server 100 performs authentication of the authentication token and printer ID included in the print data request. Upon determining that the authentication token and printer ID are registered (that is, the authentication is successful), in S297, the print intermediation server 100 performs a conversion process on the image file Fi identified by the job identification information Ii included in the print data request. In the conversion process, the image file Fi is converted and print data Di is generated. For example, in the conversion process, the image file may be converted to print data in PDF format. In S300, the print intermediation server 100 supplies the print data Di and print setting information Pi to the printer 110. The CPU 132 of the printer 110 receives the print data Di and print setting information Pi from the print intermediation server 100 via the wireless LAN_I/F 118.

In S310, the CPU 132 determines whether or not the printer 110 complies with the print setting indicated by the received print setting information Pi. The flow proceeds to S330 in the case of a positive determination (YES in S310) and proceeds to S315 in the case of a negative determination (NO in S310).

In S315, the CPU 132 determines whether or not the mandatory print flag Gi included in the print instruction received in S270 indicates "mandatory printable." The flow proceeds to S330 in the case of a positive determination (YES in S315) and the CPU 132 performs a print process. On the other hand, the flow proceeds to S320 in the case of a negative determination (NO in S310).

In S320, the CPU 132 sends a status change instruction to the print intermediation server 100. The status change instruction is an instruction for changing the print status information T1 of the image file Fi which is an i-th image file to "ERROR status." The status change instruction is an instruction for further adding error identification information indicating "print setting ERROR" to the print status information T1. In S325, the print intermediation server 100 performs a status change process. In this way, the content of the print status information T1 of the image file Fi stored in the print intermediation server 100 is changed from "QUEUED status" to "ERROR status." Moreover, the error identification information indicating "print setting ERROR" is added to the print status information T1. Then the process ends.

In S330, the CPU 132 supplies the acquired print data Di to the print performing unit 120. As a result, the print performing unit 120 prints an image represented by the print data Di to printing paper. This allows the user of the mobile phone 10 to acquire the printed printing paper.

In S340, the CPU 132 determines whether or not the print process using the print data Di has been normally completed (that is, completed without occurring error). The flow proceeds to S380 in the case of a positive determination (YES in S340). In S380, the CPU 132 sends a status change instruction to the print intermediation server 100. The status change instruction is an instruction for changing the print status information T1 of the image file Fi to "DONE status."

In S385, the print intermediation server 100 performs a status change process. In this way, the content of the print status information T1 of the image file Fi stored in the print intermediation server 100 is changed to "DONE status."

In response to sending the status change request, in S390, the CPU 132 determines whether or not all jobs have ended. The determination may be made depending on whether or not a count value i has reached the number of image files included in the job list information received in S280 ("3" in the present embodiment). The process ends in the case of a positive determination (YES in S390) and returns to S285 in the case of a negative determination (NO in S390).

On the other hand, the flow proceeds to S345 in the case of a negative determination (NO in S340) in S340. In S345, the CPU 132 sends a status change instruction to the print intermediation server 100. The status change instruction is an instruction for changing the print status information T1 of the image file Fi to "ERROR status." The status change instruction is an instruction for further adding error identification information indicating "machine ERROR" to the print status information T1.

In S350, the print intermediation server 100 performs a status change process. This causes the content of the print status information T1 of the image file Fi stored in the print intermediation server 100 to be changed to "ERROR status." Moreover, the error identification information indicating "machine ERROR" is added to the print status information T1.

In response to sending the status change request in S345, the flow proceeds to S360. In S360, the CPU 132 determines whether or not the error has been released. The flow returns to S360 in the case of a negative determination (NO in S360) and proceeds to S365 in the case of a positive determination (YES in S360). In S365, the CPU 132 sends a deletion instruction of the error identification information to the print intermediation server 100. In S370, the print intermediation server 100 deletes the error identification information indicating "machine ERROR" added to the print status information T1. Then the process ends.

Figure 6:
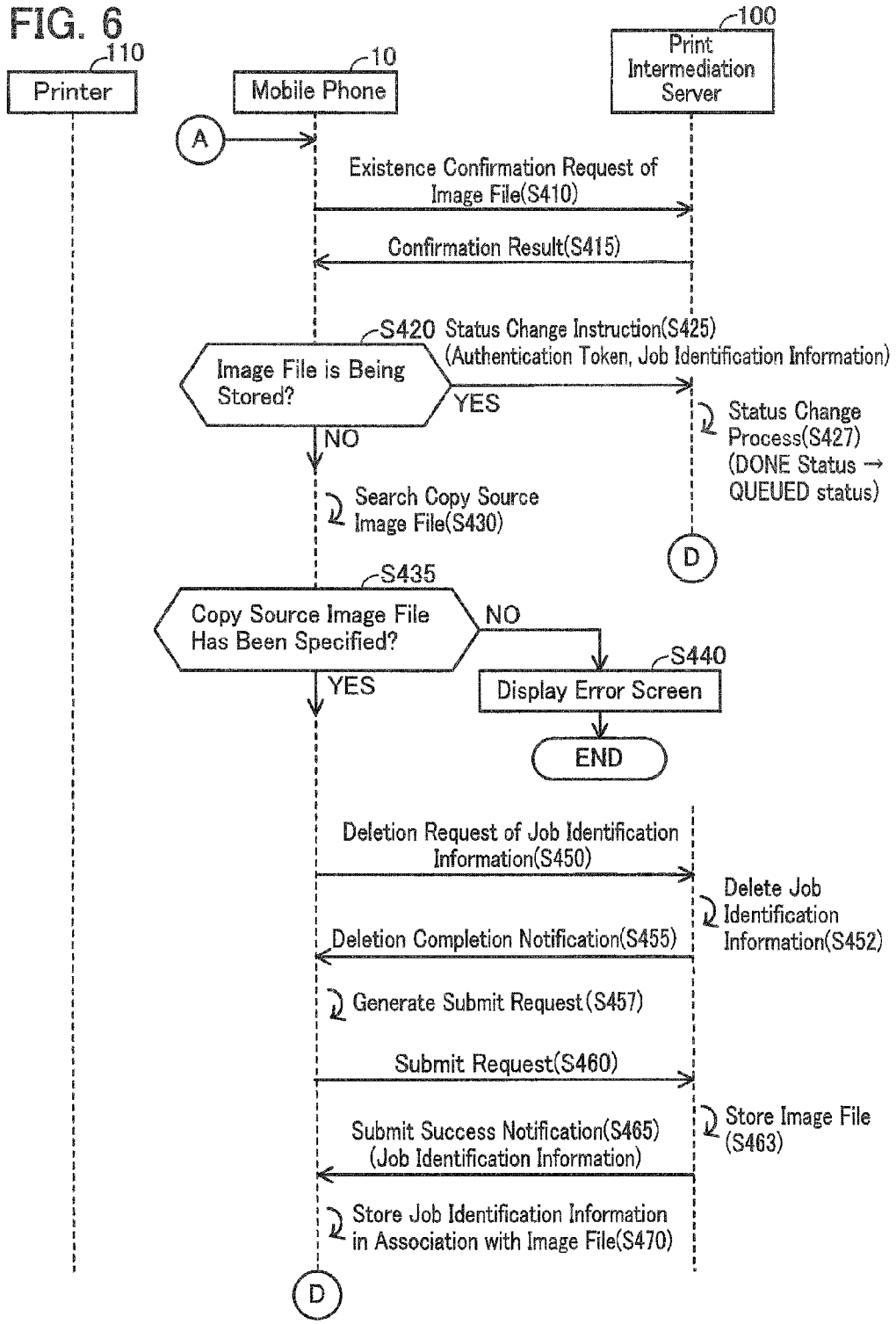
FIG. 6 illustrates a sequence diagram of a print process.
Figure 7:
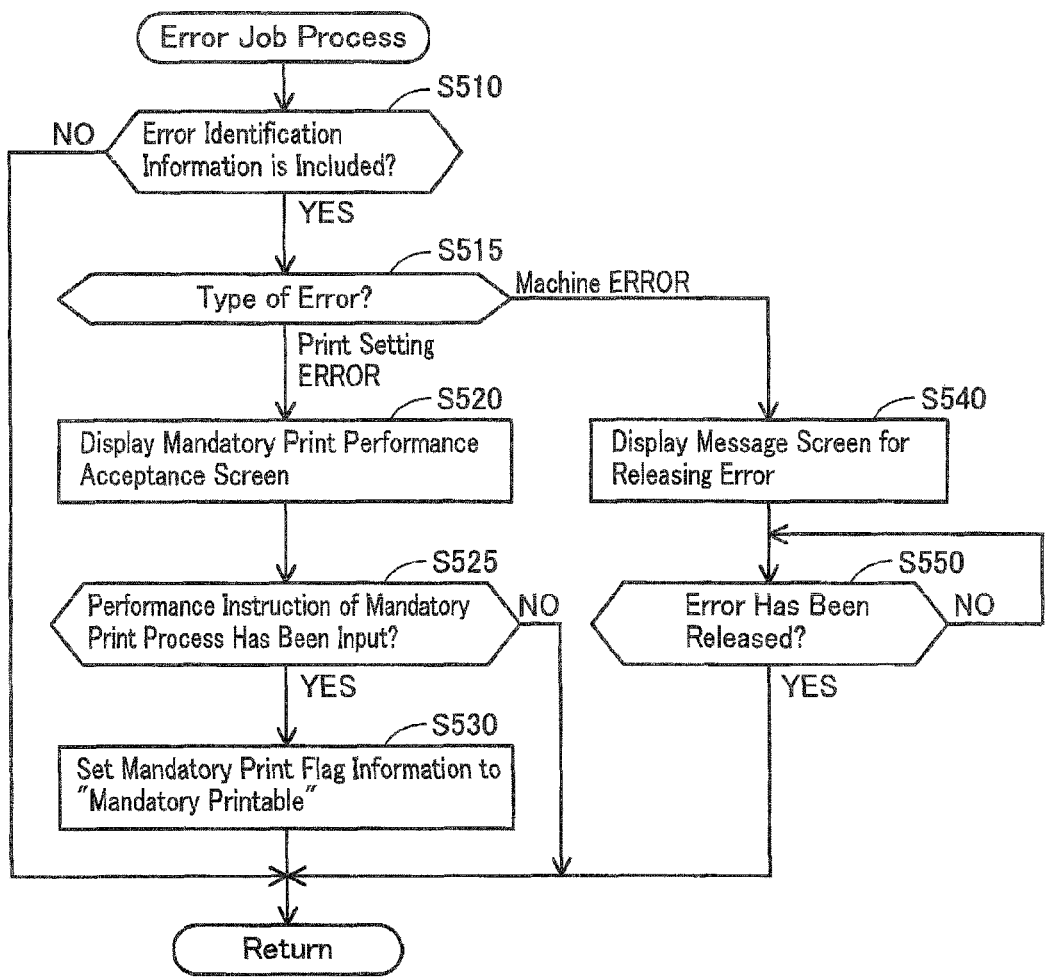
FIG. 7 illustrates a flowchart of an error job process.

On the other hand, upon accepting an input of the complete job reprint instruction in S245 of FIG. 3 (complete job reprint instruction in S245), the flow proceeds to S410 in FIG. 6. In S410, the CPU 11 sends an existence confirmation request of an image file to the print intermediation server 100. The existence confirmation request is a request for inquiring the print intermediation server 100 whether or not any image file whose print has been completed is still stored in the print intermediation server 100.

When the image file whose print status information indicates "DONE status" exists, the print intermediation server 100 may delete only the image file at any timing without deleting the job identification information of the image file. This is intended to secure a storage capacity of the print intermediation server 100. In this case, even when the file list received in S235 includes job identification information having the print status information "DONE status", it is unknown whether or not the image file identified by the job identification information is still stored in the print intermediation server 100. For this reason, in S410, it is necessary to confirm whether or not the image file identified by the job identification information having print status information indicating "DONE status" is still stored in the print intermediation server 100.

In the present embodiment, a case will be described below as an example where the file list received in S235 includes job identification information I3 corresponding to the print status information T3 of "DONE status." In this case, the existence confirmation request is sent to inquire about whether or not the image file F3 identified by the job identification information I3 is still stored in the print intermediation server 100.

In S415, the print intermediation server 100 sends to the mobile phone 10 a confirmation result indicating whether or not the image file F3 is still stored in the print intermediation server 100.

In S420, the CPU 11 determines, based on the confirmation result, whether or not the image file F3 is still stored in the print intermediation server 100. The flow proceeds to S425 in the case of a positive determination (YES in S420). In S425, the CPU 11 sends a status change instruction to the print intermediation server 100. The status change instruction is an instruction for changing the print status information T3 on the image file F3 from "DONE status" to "QUEUED status." The status change instruction includes the authentication token and job identification information I3. In S427, the print intermediation server 100 performs a status change process. This causes the content of the print status information T3 of the image file F3 to be changed from "DONE status" to "QUEUED status." The flow then returns to S263.

On the other hand, in the case of a negative determination in S420 (NO in S420), the flow proceeds to S430. In S430, the CPU 11 searches, in the storage unit 12, for the image file F3 which is a copy source of the image file F3 stored in the print intermediation server 100. The search method will be described. Through the aforementioned process in S150, the storage unit 12 stores the job identification information I3 of the image file F3 in association with the image file F3. Therefore, the CPU 11 can identify the image file F3 which is the copy source of the image file F3 stored in the print intermediation server 100 by searching the image file with which the job identification information I3 is associated.

In S435, the CPU 11 determines whether or not the image file F3 which is the copy source has been specified. The flow proceeds to S440 in the case of a negative determination (NO in S435). In S440, the CPU 11 causes an error screen to be displayed on the panel 18. The error screen may include, for example, a character string such as "no image data exists." Then the process ends.

On the other hand, in the case of a positive determination in S435 (YES in S435), the flow proceeds to S450. In S450, the CPU 11 sends a deletion request of the job identification information I3 to the print intermediation server 100. In S452, the print intermediation server 100 deletes the job identification information I3. This prevents the button image relating to the image file F3 deleted from the print intermediation server 100 from being displayed on the job list screen (S240). In S455, the print intermediation server 100 sends a deletion completion notification to the mobile phone 10.

In S457, the CPU 11 generates a submit request. The submit request includes the printer ID and the image file F3 specified in S430. In S460, the CPU 11 sends the submit request to the print intermediation server 100. In S463, the print intermediation server 100 stores the image file F3 in association with the printer ID included in the submit request. In S465, the print intermediation server 100 supplies a submit success notification to the mobile phone 10. The submit success notification includes the job identification information I4 for identifying the image file F3. In S470, the CPU 11 stores the job identification information I4 included in the submit success notification in association with the image file F3 in the storage unit 12. Then the flow returns to S263.

For a printing system that prints an image file uploaded to a print intermediation server using a printer, the following operation is performed. That is, when the printer fails in printing due to an ink shortage, printing paper size mismatch or the like, the print status of an image file whose printing has failed is set to "ERROR status." The above printing system cannot cause the printer to print the image file corresponding to the print status of "ERROR status." To cause the printer to print the image file with the error, the image file needs to be re-uploaded to the print intermediation server. However, for example, when the image file represents a web page or the like, it may be difficult for the user to identify the image file with the error. Moreover, the image file with the error may be lost. Under such statuses, it is difficult to cause the printer to print the image file with the error. The print application 21a of the present embodiment can change print status information stored in the print intermediation server 100 from "ERROR status" indicating an error to "QUEUED status" in which a print process is being waited (S255). In this way, in the print intermediation server 100, the image file with the error is changed to an image file which is waiting for a print process (S260). Therefore, it is possible to print the image file with the error without the need for re-uploading the image file with the error to the print intermediation server 100.

In the above printing system, when printing of an image file is completed without any error, the print status of the image file whose printing has been completed is set to "DONE status." In the above printing system, it is not possible to reprint the image file corresponding to a print status of "DONE status." To reprint the image file whose printing has been completed, the image file needs to be re-uploaded to the print intermediation server. However, as described above, there may be a status in which it is difficult to re-upload the image file. The print application 21a of the present embodiment can change the print status information stored in the print intermediation server 100 from "DONE status" indicating print completion to "QUEUED status" in which a print process is being waited (S425). In this way, the print intermediation server 100 causes the image file whose printing has been completed to be changed to an image file in which a print process is being waited (S427). Therefore, it is possible to cause the printer to reprint the image file whose printing has been completed without the need for re-uploading the image file whose printing has been completed to the print intermediation server 100.

The print application 21a confirms whether or not an image file corresponding to print status information of "DONE status" (that is, image file whose printing has been completed) is still stored in the print intermediation server 100 (S410). When the image file whose printing has been completed is deleted from the print intermediation server 100 (NO in S420), the print application 21a searches an image file which is a copy source of the image file from the mobile phone 10 (S430). The print application 21a re-uploads the searched image file to the print intermediation server 100 (S460). When the image file whose printing has been completed should be reprinted, this eliminates the need for the user to search the image file from the mobile phone 10. It is thereby possible to increase convenience for the user.

When submitting the image file to the print intermediation server 100 (S140), the print application 21a receives job identification information of the image file from the print intermediation server 100 (S145). The print application 21a causes the job identification information to be stored in the mobile phone 10 in association with the image file of the copy source of the image file (S150). This allows the print application 21a to speedily search the image file of the above copy source using the job identification information (S430).

In response to accepting an instruction for changing the print status information stored in the print intermediation server 100 from "ERROR status" indicating an error to "QUEUED status" in which a print process is being waited (error job reprint instruction in S245), the print application 21a determines the type of the error (S515). When the type of the error is "print setting ERROR" (print setting ERROR in S515), the print application 21a determines that the printer can perform printing and performs the mandatory print process (S530). Alternatively, when the type of the error is "machine ERROR" (machine ERROR in S515), the print application 21a determines that the printer cannot perform printing and does not perform the mandatory print process (S540). Despite the occurrence of the machine ERROR, this can prevent print errors from recurring due to execution of the mandatory print process.

When a print error occurs due to incompatibility of the print setting information with the printer 110 (NO in S310), the printer 110 adds error identification information of "print setting ERROR" to the print status information stored in the print intermediation server 100. The error identification information of "print setting ERROR" is information indicating that the mandatory print process can be performed. When a print error occurs due to machine trouble of the printer 110 (e.g., when the amount of a consumable item falls to or below a predetermined value or when jamming occurs in a printing medium) (NO in S340), the printer 110 adds error identification information of "machine ERROR" to the print status information stored in the print intermediation server 100. The error identification information of "machine ERROR" is information indicating that a mandatory print process cannot be performed. Despite the occurrence of the machine ERROR, this can prevent print errors from recurring due to execution of the mandatory print process.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

In S255, timing at which the status change instruction to be sent to the print intermediation server 100 is sent is not particularly limited. For example, the status change instruction may be sent to the print intermediation server 100 in response to detecting a touch of the mobile phone 10 to the printer 110 in S265. This allows the operation of bringing the mobile phone 10 close to the printer 110 within a predetermined distance therefrom to be handled as an operation of starting transmission of the status change instruction. This eliminates the necessity for a special operation for starting transmission of the status change instruction, and can thereby increase convenience for the user.

The job identification information I1 to I3 may be file path information, optional tag information or the like, for example.

A case has been described in the above embodiment where an image file is shared, but the present invention is not limited to this embodiment. The job name generating process is applicable to a case where various types of files such as a file in a document generating application format or text file are shared.

The process of storing job identification information in association with the image file of a copy source (S150, S470) may be omitted. In this case, in S430, the image file of the copy source may be searched using a file path or the like. The process of determining the type of an error may be omitted (S515). In this case, the flow may proceed from S510 to S520 by omitting S515, S540 and S550. The mandatory print process may be omitted. In this case, if NO in S310, the flow may proceed to S320. The complete job reprint process may be omitted. In this case, the process in FIG. 6 may be omitted. Generally speaking, the print application 21a needs only to perform at least S140, S240, S255 (or S425) and S270, for example.

In the process for receiving inputs of various instructions (S245), inputs of instructions corresponding to two or more image files may be received.

Instead of executing the NFC communication 200, the printer 110 and the mobile phone 10 may execute short-range wireless communication according to another communication system (for example, wireless communication such as Transfer Jet communication or infrared ray communication). Further, the printer 110 and the mobile phone 10 may execute wireless communication according to a Wi-Fi system instead of executing the NFC communication 200. Furthermore, instead of executing wireless communication, the printer 110 and the mobile phone 10 may execute wire communication. Generally speaking, any kind of communication system may be adopted as long as it is possible for the mobile phone 10 and the printer 110 to communicate with each other.

The mobile phone 10 may perform wireless communication according to a Wi-Fi system, and carry out communication of various kinds of information (for example: the submit request) with the print intermediation server 100. In a case where the mobile phone 10 is connected by wire to the Internet 70, the mobile phone 10 may perform wire communication and carry out communication with the print intermediation server 100. Generally speaking, any kind of communication system may be adopted as long as it is possible for the mobile phone 10 and the print intermediation server 100 to communicate with each other.

In a case where the printer 110 is connected by wire to the Internet 70, the printer 110 may perform wire communication and carry out communication of various kinds of information (for example: the file list) with the print intermediation server 100. Generally speaking, any kind of communication system may be adopted as long as it is possible for the printer 110 and the print intermediation server 100 to communicate with each other.

The print intermediation server 100 need not be a single server, and may be a plurality of servers that are constituted by separate members. For example, the print intermediation server 100 may include a first server that executes the respective processing operations shown in the submit process in FIG. 2, and a second server (that is, a second server that is constituted separately from the first server) that executes the respective processing operations shown in the print process in FIGS. 3 to 7.

A device on which the print application 21a operates is not limited to the mobile phone 10, and may be a stationary PC or may be another device (for example, a television or the like).

In the respective embodiments described above, the respective processing operations illustrated in FIG. 2 to FIG. 7 etc. and the like are realized by the CPU 132 of the printer 110 and the CPU 11 of the mobile phone 10 executing programs stored in the storage units 134 and 12. However, a configuration may also be adopted in which, instead, at least one of the respective processing operations illustrated in FIG. 2 to FIG. 7 etc. and the like is realized by hardware such as a logical circuit.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

The invention claimed is:

1. A non-transitory computer-readable recording medium storing computer-readable instructions for an information processing device,
    the computer-readable instructions, when executed by a processor of the information processing device, causing the information processing device to perform:
    accepting a selection of an image file;
    in response to accepting the selection of the image file, sending the selected image file to a server via a communication interface of the information processing device, so as to store the selected image file in the server;
    receiving identification information and status information from the server via the communication interface, the identification information being for identifying an image file being stored in the server, the status information indicating a print process status of the image file being stored in the server, the status information indicating any one of a plurality of statuses including a first status and a second status, the first status indicating a status where a print process for an image file has not been performed, the second status indicating a status where a print process for an image file has been performed;
    causing a display unit of the information processing device to display a first screen indicating the received identification information and the received status information;
    accepting, while the first screen is displayed, an input for changing status information of a designated image file which is identified by designated identification information designated from among the received identification information;
    sending a change instruction to the server via the communication interface, in response to accepting the input for changing the status information of the designated image file from the second status into the first status;
    accepting an input for performing a process of sending print instruction information and authentication information to a printer, the authentication information being for accessing the image file being stored in the server, the print instruction information being for causing the printer to acquire print data from the server, the print data being generated based on an image file having the status information indicating the first status, the authentication information being used by the printer to acquire the print data from the server; and
    sending the print instruction information and the authentication information to the printer via the communication interface, in response to accepting the input for performing the process of sending the print instruction information and the authentication information to the printer.

2. The non-transitory computer-readable recording medium as in claim 1, wherein
    the second status includes a print completion status indicating a status where a print process has been completed without occurring an error,
    the computer-readable instructions, when executed by the processor of the information processing device, cause the information processing device to further perform:
    in response to accepting, while the first screen is displayed, the input for changing the status information of the designated file which is a print completion image file having status information indicating the print completion status, determining whether the designated image file is being stored in the server; and
    sending the change instruction to the server via the communication interface when it is determined that the designated image file is being stored in the server.

3. The non-transitory computer-readable recording medium as in claim 2, wherein
    the computer-readable instructions, when executed by the processor of the information processing device, cause the information processing device to further perform:
    judging whether a corresponding image file corresponding to the print completion image file is being stored in a storage unit of the information processing device, when it is determined that the designated image file is not being stored in the server;
    sending the corresponding image file to the server via the communication interface so as to store the corresponding image file in the server, when it is judged that the corresponding image file is being stored in the storage unit; and
    causing the display unit to display an error image, when it is judged that the corresponding image file is not being stored in the storage unit.

4. The non-transitory computer-readable recording medium as in claim 3, wherein
    the sending of the selected image file to the server is performed by sending a copy image file of a source image file being stored in the storage unit,
    the computer-readable instructions, when executed by the processor of the information processing device, cause the information processing device to further perform:
    in response to sending to the server the selected image file which is the copy image file, receiving, from the server via the communication interface, identification information for identifying the copy image file being stored in the server; and
    storing, in association with the source image file in the storage unit, the received identification information for identifying the copy image file,
    wherein the judging is performed by searching, in the storage unit, the source image file associated with identification information which is identical to the designated identification information.

5. The non-transitory computer-readable recording medium as in claim 1, wherein
    the second status includes an error status indicating a status where an error occurs in a print process,
    the computer-readable instructions, when executed by the processor of the information processing device, cause the information processing device to further perform:
    causing the display unit to display a second screen, in response to accepting, while the first screen is displayed, the input for changing the status information of the designated image file which is an error image file having status information indicating the error status, the second screen being for accepting an input of a selection related to whether printing is to be performed, wherein the sending of the change instruction to the server is performed, in response to accepting, while the second screen is displayed, an input of a selection indicating that printing is to be performed.

6. The non-transitory computer-readable recording medium as in claim 5, wherein
the computer-readable instructions, when executed by the processor of the information processing device, cause the information processing device to further perform:
sending print setting information for the selected image file to the server via the communication interface,
wherein the error status includes a print setting error status indicating that an error occurs in a print process due to the print setting information being inappropriate for the printer, and
the second screen is displayed, in response to accepting, while the first screen is displayed, the input for changing the status information of the designated image file which is the error image file having the status information indicating the print setting error status.

7. The non-transitory computer-readable recording medium as in claim 5, wherein
wherein the error status includes a machine error status indicating that an error occurs in a print process due to a machine trouble of the printer, and
the second screen is not displayed, when accepting, while the first screen is displayed, the input for changing the status information of the designated image file which is the error image file having the status information indicating the machine error status.

8. The non-transitory computer-readable recording medium as in claim 1, wherein
the communication interface includes an NFC interface,
the sending of the change instruction is performed, in response to communicating with the printer via the NFC communication interface due to the information processing device being closer to the printer within a predetermined distance, after accepting, while the first screen is displayed, the input for changing the status information of the designated image.

9. The non-transitory computer-readable recording medium as in claim 1, wherein
the communication interface includes a first interface and a second interface, the second interface being for communicating using a communication method different from that of the first interface, and
the sending of the change instruction is performed via the second interface, in response to communicating with the printer via the first interface, after accepting, while the first screen is displayed, the input for changing the status information of the designated image file.

10. An information processing device comprising:
a display unit;
a communication interface;
a processor; and
a memory storing computer-readable instructions therein, the computer-readable instructions, when executed by the processor, causing the information processing device to perform:
accepting a selection of an image file;
in response to accepting the selection of the image file, sending the selected image file to a server via the communication interface, so as to store the selected image file in the server;
receiving identification information and status information from the server via the communication interface, the identification information being for identifying an image file being stored in the server, the status information indicating a print process status of the image file being stored in the server, the status information indicating any one of a plurality of statuses including a first status and a second status, the first status indicating a status where a print process for an image file has not been performed, the second status indicating a status where a print process for an image file has been performed;
causing the display unit to display a first screen indicating the received identification information and the received status information;
accepting, while the first screen is displayed, an input for changing status information of a designated image file which is identified by designated identification information designated from among the received identification information;
sending a change instruction to the server via the communication interface, in response to accepting the input for changing the status information of the designated image file from the second status into the first status;
accepting an input for performing a process of sending print instruction information and authentication information to a printer, the authentication information being for accessing the image file being stored in the server, the print instruction information being for causing the printer to acquire print data from the server, the print data being generated based on an image file having the status information indicating the first status, the authentication information being used by the printer to acquire the print data from the server; and
sending the print instruction information and the authentication information to the printer via the communication interface, in response to accepting the input for performing the process of sending the print instruction information and the authentication information to the printer.

11. A printer comprising:
a communication interface;
a print performing unit;
a processor; and
a memory storing computer-readable instructions therein, the computer-readable instructions, when executed by the processor, causing the printer to perform:
receiving print instruction information and authentication information from an information processing device via the communication interface, the authentication information being for accessing an image file being stored in a server;
receiving identification information and status information from the server via the communication interface by using the authentication information, in response to receiving the print instruction information and the authentication information from the information processing device, the identification information being for identifying the image file being stored in the server, the status information indicating a print process status of the image file being stored in the server, the status information indicating any one of a plurality of statuses including a first status and a second status, the first status indicating a status where a print process for an image file has not been performed, the second status indicating a status where a print process for an image file has been performed;
specifying, from among the received identification information, identification information for identifying an image file having status information indicating the first status;

sending a request to the server via the communication interface for sending print data being generated based on the specified image file identified by the specified identification information;

receiving the print data from the server via the communication interface in response to sending the request to the server;

causing the print performing unit to perform a print process by using the print data; and sending a change instruction to the server via the communication interface in a case where an error occurs in the print process, the change instruction being for changing the status information of the specified image file from the first status into the second status.

12. The printer as in claim 11, wherein the computer-readable instructions, when executed by the processor of the printer, cause the printer to further perform:

receiving print setting information corresponding to the print data from the server via the communication interface, wherein the sending of the change instruction includes:

sending a first change instruction to the server via the communication interface, in a case where the error occurs in the print process due to the print setting information being inappropriate for the printer, the first change instruction being for changing the status information of the specified image file from the first status into the second status that it is capable of returning from the second status into the first status; and sending a second change instruction to the server via the communication interface, in a case where the error occurs in the print process due to a machine trouble of the printer, the second change instruction being for changing the status information of the specified image file from the first status into the second status that it is not capable of returning from the second status into the first status.

* * * * *